April 15, 1947.  R. S. STICKNEY  2,419,096

FUEL INDUCTION MEANS FOR INTERNAL COMBUSTION ENGINES

Filed April 28, 1944  3 Sheets-Sheet 1

ROBERT S. STICKNEY,
INVENTOR.

BY
ATTORNEY.

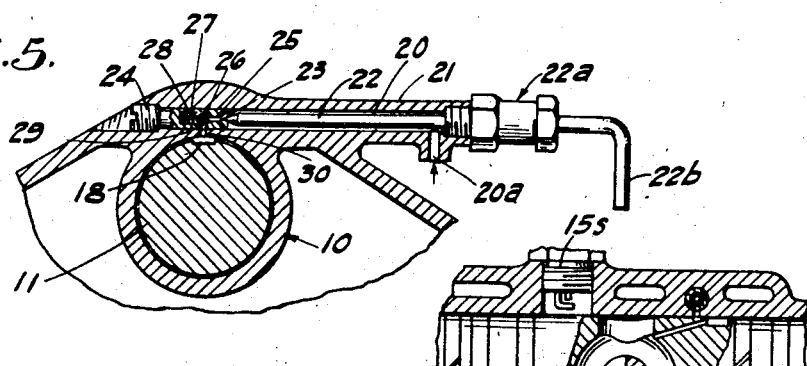
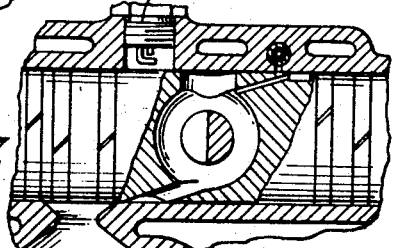
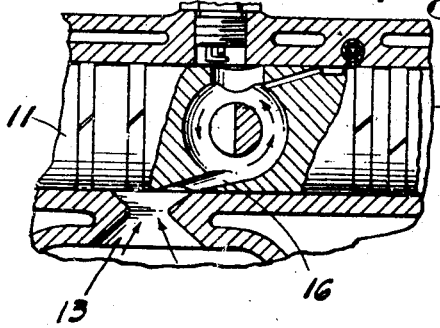
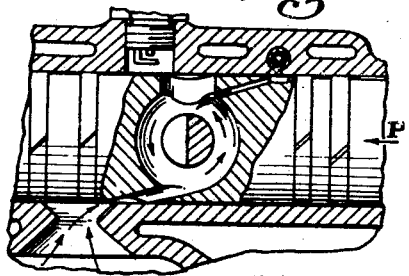
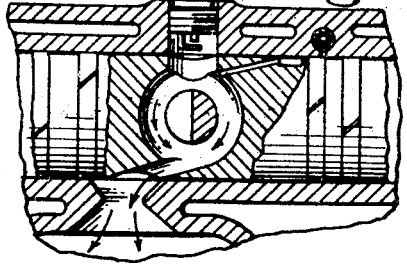
Robert S. Stickney,
INVENTOR.

April 15, 1947.  R. S. STICKNEY  2,419,096
FUEL INDUCTION MEANS FOR INTERNAL COMBUSTION ENGINES
Filed April 28, 1944  3 Sheets-Sheet 3

INVENTOR.
ROBERT S. STICKNEY
BY
ATTORNEY.

Patented Apr. 15, 1947

2,419,096

UNITED STATES PATENT OFFICE 2,419,096

FUEL INDUCTION MEANS FOR INTERNAL-COMBUSTION ENGINES

Robert S. Stickney, Los Angeles, Calif.

Application April 28, 1944, Serial No. 533,222

8 Claims. (Cl. 123—32)

This invention relates to fuel induction means for internal combustion engines.

Speaking more specifically, the invention pertains to a fuel induction structure mounted in an immediately adjacent relation to a piston cylinder of an internal combustion engine and entirely independent of any of the more remotely located mechanical devices heretofore ordinarily used to inject the fuel into the combustion chamber.

The cyclic function of this device may be likened to that of an induction coil, wherein the low electrical voltage in the primary coil is increased to a higher voltage in the secondary coil.

This fuel induction system employs a method wherein the air while being compressed by the piston within the main working cylinder of the engine is, at the proper time, allowed to enter through a fuel supply passageway that registers with a pre-combustion chamber and energy cell placed within a movable engine operated plunger to accomplish the intended purpose.

The general object of the invention is to provide a more compact, simpler and more efficient means for introducing an agitated mixture of fuel and air into the combustion chamber.

Among more specific objects of the invention are: to provide, in a juxtaposed, communicating relation to a combustion chamber of an internal combustion engine, an improved energy cell into which the liquid fuel is introduced and wherein it is atomized and thoroughly mixed with air in a highly turbulent condition; to induct fuel into an energy cell and thence to the combustion chamber without the aid of the expensive and of the high precision mechanical devices now in use to inject fuel into an internal combustion engine; to cut to the minimum the production and maintenance cost of a device of the kind to which the invention pertains; to control more efficiently the combustion within the main combustion chamber, thereby eliminating the detrimental high pressure waves which set up excessive stresses within the engine; to make it possible satisfactorily to operate the engine with either the lighter fuels, such as gasoline or alcohol, or with the less costly, heavier fuels in the safety fuel range; to make it possible to start an engine on gasoline under extremely cold climatic conditions, and then after the temperature of the engine has been sufficiently increased, to switch over to a heavier and less volatile fuel, by simply cutting off the gasoline by means of a manual control, or thermostatically controlled valve, and thereupon opening a similarly controlled valve to admit the heavier fuel; to make it possible to operate the engine on low octane gasoline with compression ratios even higher than the compression ratios that are now in use for 100% octane gasoline; to begin the flame propagation at such a point that the heat absorbed by the unburnt fuels and causing spontaneous combustion will be put to useful work because of the pressure waves set up and forcing or blasting the richly mixed fuel and air out of the pre-combustion chamber and energy cell and into the main combustion chamber, thereby aiding to produce the turbulence requisite for quick and complete combustion.

The aforesaid objects are accomplished by the use of two cooperating chambers, one a very low pressure and the other a very high pressure chamber, the former chamber being an auxiliary combustion chamber comprising a combination pre-combustion chamber and energy cell, and the latter the main combustion chamber. This is done by moving the low pressure chamber into and out of communication with the high pressure chamber in a properly timed manner.

Referring to the accompanying drawings, which illustrate what is at present deemed to be a preferred embodiment of the invention:

Fig. 5 is a sectional view showing the upper portion of Fig. 1 on an enlarged scale, the plane of section being indicated by the line 5—5 on Fig. 1.

Figs. 6, 7, 8, 9 and 10 are enlarged fragmentary longitudinal mid-sections of the portion of the device which contains the pre-combustion chamber and energy cell, showing successive positions of the plunger which contains the auxiliary chamber comprising the pre-combustion chamber and energy cell, throughout a cycle of the movement thereof.

Figure 1:
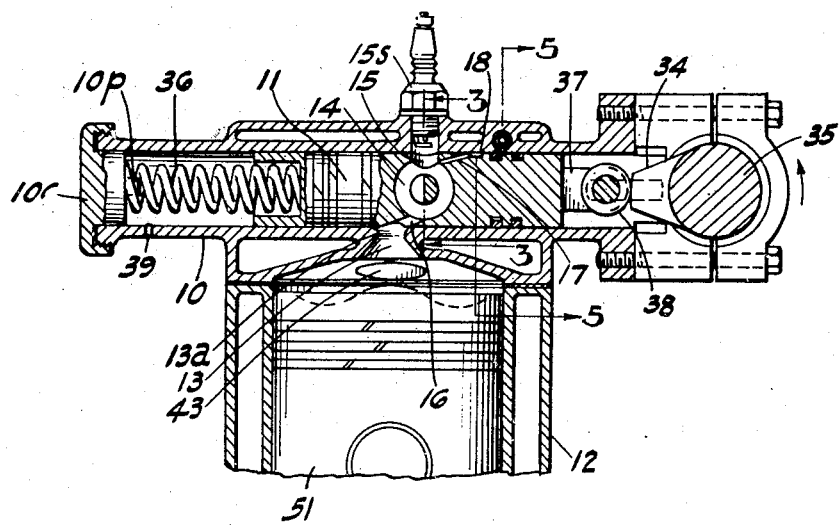
Fig. 1 is a longitudinal midsection of the fuel induction means provided by the invention, the view including the fuel intake portion of an engine cylinder with which said means is associated.
Figure 2:
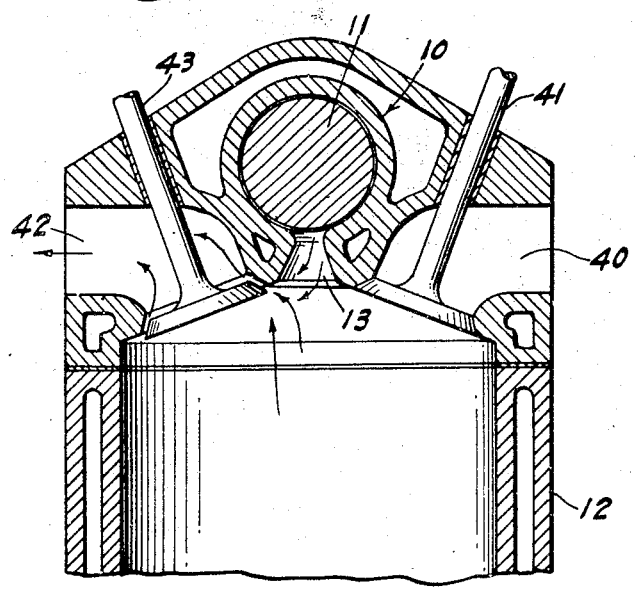
Fig. 2 is an enlarged vertical section of the structure shown in Fig. 11, the plane of section being indicated by the line 2—2 on the latter view.
Figure 3:
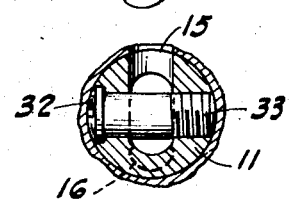
Fig. 3 is an enlarged cross section taken through the pre-combustion chamber and energy cell on line 3—3 of Fig. 1.

Referred in detail to the drawings, and describing first the general assembly illustrated in Figs. 1 and 2, the induction means comprises an induction plunger-containing cylinder 10 and plunger 11 within said cylinder. Said cylinder 10 is shown extending diametrically across and associated with the end portion of a liquid cooled engine cylinder 12, said engine cylinder having a head provided with a central restricted passageway 13 which communicates with said plunger cylinder near the midlength of the latter. Said restricted passageway 13 is shown hour-glass shaped, with its isthmus 13a located nearer to its upper than its lower end.

In the central portion of the plunger 11 in respect both to its length and to its diameter, there is located a circular chamber 14 which opens out at one side of the plunger through a spacious radial opening 15 which is at times brought into alinement with the spark plug 15s. At the opposite side of said plunger there is a passage 16 which leads tangentially from said chamber and extends lengthwise in relation to the plunger 11, this passage being considerably less in its cross-sectional extent than the aforementioned radial opening 15.

In addition to the opening 15 and the passage 16, a liquid fuel supply passageway 17 is provided for the chamber 14 which (as the device is viewed in the drawings) leads into the upper portion of the chamber 14, and which, in relation to the circular chamber, is oppositely tangential to the already mentioned passage 16. Said passageway 17 is shown as a straight drilled duct which inclines downwardly from a small fuel feed recess 18 located in the upper side of the plunger 11, said recess being clearly shown as rectangular in cross section in Figs. 5 and 6. Said recess 18 is at the proper times brought into registration with the inner portion of the fuel supply passage 20 in the tubular extension 21, the fuel intake through said passage 20 being controlled by a needle valve 22 the point portion of which cooperates with a suitable recessed seat 23, said seat being formed in the inner end of a demountable plug 24. The needle portion 22 is supported by a packing gland 22a and is manually adjustable by means of the handle 22b.

The passageway 20 adjacent its needle controlled end communicates with a laterally deflected passage 20a leading to a suitable source of supply. Adjacent the plugged end of the passageway 20 where the recessed seat 23 is formed in the plug 24, said passageway 20 joins up with a restricted passageway 25 normally closed, at its end opposite the seat 23, by a ball 26 actuated by the spring 27, there being a recess 28 within the plug in which to house said spring. Leading into the recess 28 from its under side is a short duct 29 which registers with a similar duct 30 in the cylinder wall 10 which in turn communicates with the recess 18.

The plug 24 is screwthreaded at its outer end to cooperate with the screwthreaded portion of the passageway 20 at that end to regulate the registry positions of the ducts 29 and 30.

In order to augment the whirling movement of the air and liquid fuel within the chamber 14 a semicircular core is located near the center thereof which, by preference and as shown, consists of a headed pin 31 having a semicircular recess 31a in one side between its head 32 and the screwthreaded inner part 33 of the pin, said screwthreaded part of the pin being screwed into a bore for it in the side portion of the plunger 11, both ends of the pin being flush with side portions of said plunger.

A properly timed, intermittent supply of fuel through the passageway 17 is effected by a cam 34 carried by the engine operated shaft 35, said cam from time to time as shown by stages in Figs. 11-15 moving the plunger 11 in opposition to a compression spring 36 located at the opposite end of the plunger. Said plunger at one end carries an axial stem 37 upon which is mounted an antifriction roller 38 upon which the cam acts, and at its opposite end said plunger is recessed to provide a seat for the inner end of the spring 36. The outer end of said spring abuts against a cap 10c which is screwed onto the cylinder 10, said cap carrying a pin 10p to aid in keeping in place the spring. A vent 39 is shown in said cylinder to keep air pressure from impeding the movement of the plunger 11.

Mentioning briefly the conventional engine structure with which the device cooperates, the air intake passage 40 (Fig. 2) is controlled by a valve 41 and the exhaust port 42 is controlled by a valve 43, said valves being operated in their opening and closing movements by properly timed, conventional, engine operated means.

Figure 11:
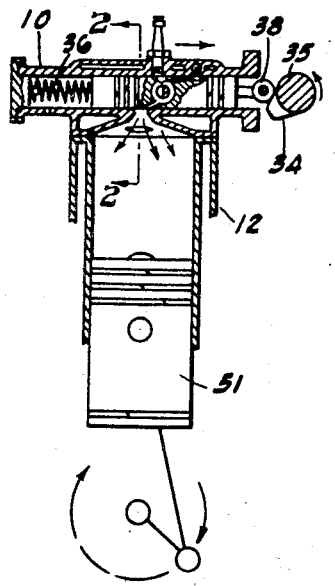
Figs. 11, 12, 13, 14 and 15 are longitudinal vertical mid-sections on a smaller scale of the portion of the device which contains the pre-combustion chamber and energy cell, showing the relative relations of the engine-operated cam and piston during the successive stages of the operation of the device.
Figure 16:
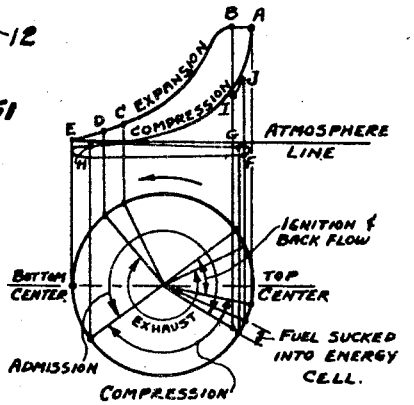
Fig. 16 is a diagrammatical showing of the different pressure stages with reference to the cyclic showings in Figs. 11 to 15.

The operation, which is based on that of a four cycle internal combustion engine, will be readily understood by noting the cycle of movement through which the reciprocating plunger 11 is actuated in timed relation with respect to the engine piston as illustrated in Figs. 6, 11; 7, 12; 8, 13; 9, 14; and 10, 15; when compared with the diagrammatical showing in Fig. 16; the former showing the stages of operation with reference to the registering of the auxiliary combustion chamber with the main combustion chamber, and the latter view showing the different pressure stages throughout the four stroke cycle operation. The four stages of operation are: exhaust, admission, compression and expansion. The following description will be set forth in that order.

The cam 35 shown in Figs. 11-15 will be geared in relation to a crank-shaft (not shown) in the ratio of one revolution of the cam to two revolutions of the crank-shaft.

In Fig. 11 the anti-friction roller 38 has followed the contour of the cam to a point close to the heel of the cam as shown in Fig. 11 and represented by point D in Fig. 16.

Referring to Fig. 6 it will be seen that the passageway 16 is in communication with the main combustion chamber 12 and the plunger 11 is moving in the direction as indicated by the arrow P. The passageway communication will be cut off when the piston in the main working cylinder has reached bottom center as shown in Fig. 16 at E. The plunger continues to move in the direction shown in Fig. 6 by the arrow until it reaches the heel of the cam shown in Fig. 12. The above description refers to that part of the cycle wherein the auxiliary combustion chamber pressure will have dropped from a very high pressure to atmospheric pressure, the atmosphere line being shown in the indicator diagram in Fig. 16. This drop in pressure is shown in the expansion line as indicated in the latter diagram from point D to point E.

Figure 12:
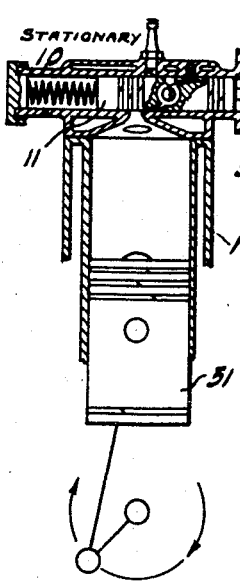
Figure 13:
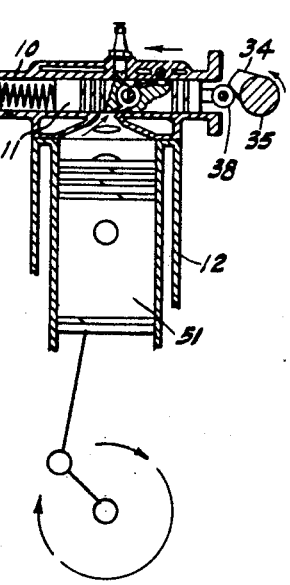
Figure 14:
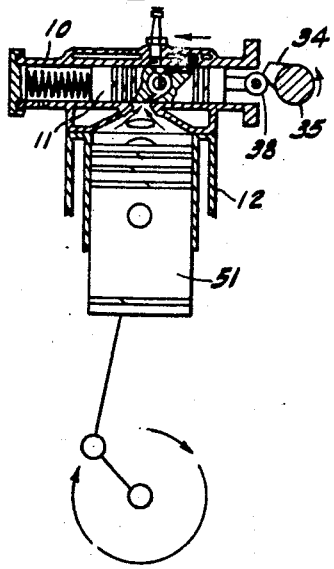

After communication with auxiliary combustion chamber and the main combustion chamber has been cut off and the plunger has moved to the position shown in Figs. 7 and 12 the auxiliary combustion chamber is isolated from the main combustion chamber and the pressure in the auxiliary combustion chamber is at atmospheric pressure. It will be noted that in the position wherein the reciprocating plunger follows the heel of the cam the plunger is in a static or stationary position. The reciprocating plunger remains in this position throughout the exhaust, admission and a large portion of the compression stroke of the main piston 51. This operation can be followed in the indicator diagram in the stage of the cycle from E to G; G to F; F to H; and H to I.

At I the reciprocating plunger has already begun to return in the direction as shown in Fig. 8 and has reached the point where the auxiliary combustion chamber is in communication with the main combustion chamber. It is at this point that the highly compressed air from the main combustion chamber enters the energy cell at a very high velocity (keeping in mind that the pressure and the fuel suspended at the seat 23, Fig. 5) up to this time has been maintained at atmospheric pressure.

Figure 4:
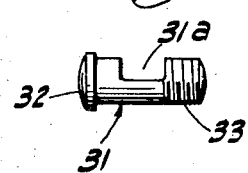
Fig. 4 is a side elevation separately showing the core-forming pin of the pre-combustion chamber and energy cell.

The air is directed by the deflector pin 31, Fig. 4, and flows in one direction only. As the air flows through the fuel supply passageway 17, Fig. 8, there will be a dragging or suction action on the air causing the pressure in this passageway, which as stated up to now has been atmospheric, to drop below atmospheric pressure sufficiently to retract the ball 26 against the opposition of the spring 27. Thereupon a perceptible amount of the fuel suspended in the fuel line 20, Fig. 5, and up to the seat 23 will be forced by atmospheric pressure, augmented by the suction thereon as aforesaid, through the restricted passage 25, by-passing the ball check valve 26, into the passage 18 and thence into the fuel supply passageway 17.

From passageway 17 the fuel is entrained into the auxiliary combustion chamber by the air moving around the inner walls of the auxiliary combustion chamber shown by the circumferentially directed arrows. The time and travel for this part of the cycle of operation is shown in Fig. 16 by the indication I to J. The reciprocating plunger 11 will have reached the position shown in Fig. 9 at the time when the point J has been reached in the indicator diagram. From point J to point A, as shown in Fig. 16, the plunger is moving in the direction as shown by the arrow P in Fig. 9. It will here be noted that the registering of the port 18 has been cut off from the fuel orifice.

From the stage of operation shown in Fig. 9 to that shown in Fig. 10 the air from the main combustion chamber continues to flow into the auxiliary combustion chamber because the piston in the main working cylinder is moving toward top center and compressing the air. During the period of motion from that shown in Fig. 9 to that shown in Fig. 10 (for plunger cam reference see Fig. 14 and Fig. 15) the air is swirling around in the auxiliary combustion chamber thoroughly mixing with and atomizing the fuel therein. The time and travel for this part of the cycle of operation is shown in Fig. 16 by the stage from J to A.

When the reciprocating plunger has reached the position as shown in Fig. 10 the registering of the energy cell with the main combustion chamber is fully open and complete. At this period ignition occurs and the fuel and air mixture begins to burn. The heat generated at the start of the fuel burning will cause the unburnt fuel to spontaneously expand causing high pressure waves to be set up and at the same time bringing about a back flow from the auxiliary combustion chamber into the main combustion chamber. The fuel and air mixture back-flowing through the choked entrance or isthmus 13a into the main combustion chamber will have sufficient kinetic energy to blast it to all parts of the combustion chamber and bring about a high turbulence that will thoroughly mix it with the air that has remained in said main combustion chamber.

Figure 15:
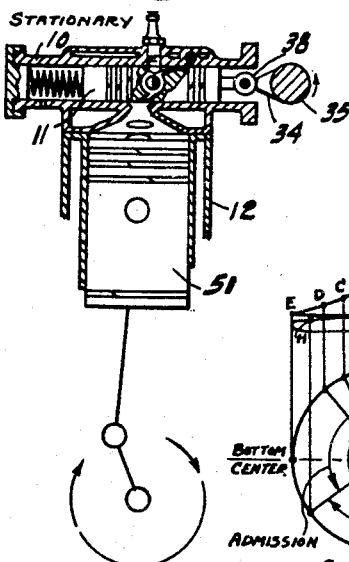

The propagation of the flame from the beginning of ignition will follow through behind the rich mixture into the main combustion chamber causing complete and absolute combustion of all the fuel and air mixture. The time and travel for this part of the cycle of operation is shown in Fig. 16 by the stage from A to B. It will be noticed that the anti-friction roller 38 of the reciprocating plunger at this stage of the operation is resting on the toe of the cam as indicated in Fig. 15. The plunger is stationary throughout the larger part of the expansion stroke because the toe of the cam does not impart any motion to the plunger. The time and travel for this part of the cycle of operation is shown in Fig. 16 by the stage from B to C.

At the position C of the indicator diagram the plunger begins to move, due to the cam allowing the same to move from the toe toward the heel of the cam as shown in Fig. 11. The plunger leaves the toe at position C and D, Fig. 16, the registry with the main combustion chamber having been made as shown in Fig. 6.

It will be noted that at D, Fig. 16, the exhaust valve as shown in Fig. 2 has begun to open allowing the spent gases to pass out of the main combustion chamber and auxiliary combustion chamber and when the position E, Fig. 16, has been reached the pressure in the main combustion chamber and auxiliary combustion chamber has fallen to atmospheric pressure and the cycle of operation has been completed.

It should be understood that the present disclosure is for the purpose of illustration only and that this invention includes all modifications and equivalents which fall within the scope of the subject matter claimed.

What is claimed is:

1. A pre-combustion chamber and energy cell for an internal combustion engine comprising a body having within it a generally cylindrical chamber provided with a fuel supply passage leading tangentially into one side thereof and a fuel and air delivery passageway leading tangentially from its opposite side to feed the mixed fuel and air into the combustion chamber of the engine cylinder, and a core member extending longitudinally of said cylindrical chamber in a spaced relation to the walls thereof said tangential passages extending in opposite directions so as to cooperate with each other in imparting a whirling movement to the fluid as it passes around said core member.

2. An auxiliary combustion chamber including a combination pre-combustion chamber and energy cell for an internal combustion engine comprising a body having within it a generally cylindrical chamber provided with a fuel supply passageway leading tangentially into one side thereof and a fuel and air delivery passageway leading tangentially from its opposite side to feed the mixed fuel into the main combustion chamber of the engine cylinder, said tangential passageways extending in opposite directions so as to cooperate with each other in imparting a whirling movement to the fluid as it passes through the auxiliary combustion chamber, and a pin extending from end to end of said cylindrical chamber adjacent to the axis thereof and in a spaced relation to all sides thereof, to form a core around which the fluid moves in a circular path or whirl as it passes through said auxiliary combustion chamber.

3. The subject matter of claim 2, and said pin having a cut-away side portion which affords a larger space within the auxiliary combustion chamber at that side of the pin which is nearest to the tangential passage which delivers the partially combusted fuel and air mixture to the main combustion chamber.

4. In an internal combustion engine, an engine piston cylinder having an extension provided with a cylinder to contain a plunger, a plunger within said cylinder therefor, a spring contained within the latter cylinder in an opposed relation to one end of said plunger, an engine-rotated shaft carrying a cam positioned to move said plunger in one direction in opposition to said spring, and an auxiliary combustion chamber comprising a pre-combustion chamber and energy cell and including passages leading through said plunger and placed into and out of communication with the combustion chamber of the engine during the reciprocation of said plunger by reason of the action of said spring and cam thereon, one of said passages being a fuel supply passageway, another of said passages being a fuel and air delivery passage and there being an intermediate passageway with which said fuel supply passageway and said fuel air and delivery passage communicates, said intermediate passageway being annularly shaped in cross section.

5. In an internal combustion engine, an engine piston cylinder having an extension provided with an auxiliary cylinder to contain a plunger, there being a restricted passage leading from the latter cylinder to the main combustion chamber of said piston cylinder, a reciprocating plunger in the aforesaid auxiliary cylinder actuated in timed relation with respect to the movement of the piston of said engine cylinder, engine operated spring opposed means intermittently to impart axial movement to said plunger, and a pre-combustion chamber comprising a generally circular chamber within said reciprocating plunger the axis of which chamber extends transversely of the axis of said plunger, there being a passage extending into one side of said circular chamber which at times registers with the aforesaid restricted passage and also a fuel supply passageway which leads from the opposite side of said pre-combustion chamber to the adjacent side of the plunger-containing cylinder, there being a fuel supply means through the wall of the plunger-containing cylinder.

6. In an internal combustion engine, an engine piston cylinder having an extension provided with an auxiliary cylinder to contain a plunger, there being a restricted passage leading from the latter cylinder to the main combustion chamber of said piston cylinder, a reciprocating plunger in the aforesaid auxiliary cylinder actuated in timed relation with respect to the movement of the piston of said engine cylinder, engine operated spring opposed means intermittently to impart axial movement to said plunger, and a pre-combustion chamber comprising a generally circular chamber within said reciprocating plunger the axis of which chamber extends transversely of the axis of said plunger, there being a passage extending into one side of said circular chamber which at times registers with the aforesaid restricted passage and also a fuel supply passageway which leads from the opposite side of said pre-combustion chamber to the adjacent side of the plunger-containing cylinder, there being a fuel supply means through the wall of the plunger-containing cylinder, which at times communicates with the said fuel supply passageway, the aforesaid passages which communicate with said generally circular chamber being oppositely tangential to each other to cause the fluid to travel in a circular path as it passes therethrough.

7. The subject matter of claim 6, and a pin extending from end to end of said chamber of the plunger to form a core around which the fluid moves in a circular path as it passes through said circular chamber.

8. A combination pre-combustion and energy cell chamber for an internal combustion engine comprising a body having within it a generally cylindrical chamber provided with a fuel admission passage leading tangentially into one side thereof and a fuel and air delivery passage leading tangentially from its opposite side to feed the mixed fuel and air into the main combustion chamber of the engine cylinder proper, there being a radial opening in the cell that communicates with a spark plug, said tangential passages extending in opposite directions so as to cooperate with each other and said radial opening in imparting a suction at the entrance of the fuel admission passage for the purpose of inducing the fuel into the pre-combustion and energy cell chamber, and a core extending from end to end of said generally cylindrical chamber about which the mixed fuel and air travels in a circular path incident to its passage through said fuel and air passage into the main combustion chamber.

ROBERT S. STICKNEY.

REFERENCES CITED

The following references are of record in the file of this patent:

UNITED STATES PATENTS

| Number | Name | Date |
| --- | --- | --- |
| 1,501,884 | Short et al. | July 15, 1924 |
| 1,821,396 | Nardin | Sept. 1, 1931 |
| 1,900,762 | Reimann | Mar. 7, 1933 |
| 2,054,562 | Haag | Sept. 15, 1936 |
| 1,138,575 | Knaak | May 4, 1915 |

FOREIGN PATENTS

| Number | Country | Date |
| --- | --- | --- |
| 501,780 | German | July 5, 1930 |
| 114,065 | British | Oct. 19, 1917 |
| 105,674 | Australian | Nov. 10, 1938 |